US005671053A

United States Patent [19]
Wigg et al.

[11] Patent Number: 5,671,053
[45] Date of Patent: Sep. 23, 1997

[54] METHOD OF CALIBRATING LASER PROJECTOR USING MOVING REFLECTOR

[75] Inventors: Dave Wigg, Waterloo; Kurt Rueb, Kitchener, both of Canada

[73] Assignee: Virtek Vision Corp., Waterloo, Canada

[21] Appl. No.: 558,679

[22] Filed: Nov. 16, 1995

[51] Int. Cl.6 .................................................. G01B 11/00
[52] U.S. Cl. ................................... 356/375; 250/252.1
[58] Field of Search ........................... 356/375; 250/252.1

[56] References Cited

U.S. PATENT DOCUMENTS

| | | | |
|---|---|---|---|
| 4,412,121 | 10/1983 | Kremers et al. | 219/124.34 |
| 4,884,889 | 12/1989 | Beckwith, Jr. | 356/375 |
| 5,090,804 | 2/1992 | Wong et al. | 356/237 |
| 5,237,444 | 8/1993 | Schermer | 359/202 |
| 5,381,258 | 1/1995 | Bordignon et al. | 359/202 |
| 5,387,969 | 2/1995 | Marantette | 356/4.5 |

Primary Examiner—Frank G. Font
Assistant Examiner—Zandra V. Smith
Attorney, Agent, or Firm—Howard & Howard

[57] ABSTRACT

An improved method of calibrating a laser projector to reference points includes the steps of moving a reflective member in the path of a laser beam. The reflective member is moved towards a reference point, and a control for the laser projector operates in one mode of operation to move the laser beam with the reflective member. The reflective member is moved, and moves the laser beam towards one of the reference points. Once the laser beam is adjacent to the reference point, the reflective member is removed from the laser beam member. The laser projector then identifies the location of the reference point, and begins to calibrate itself relative to the work surface. This process is repeated until the calibration is complete.

19 Claims, 2 Drawing Sheets

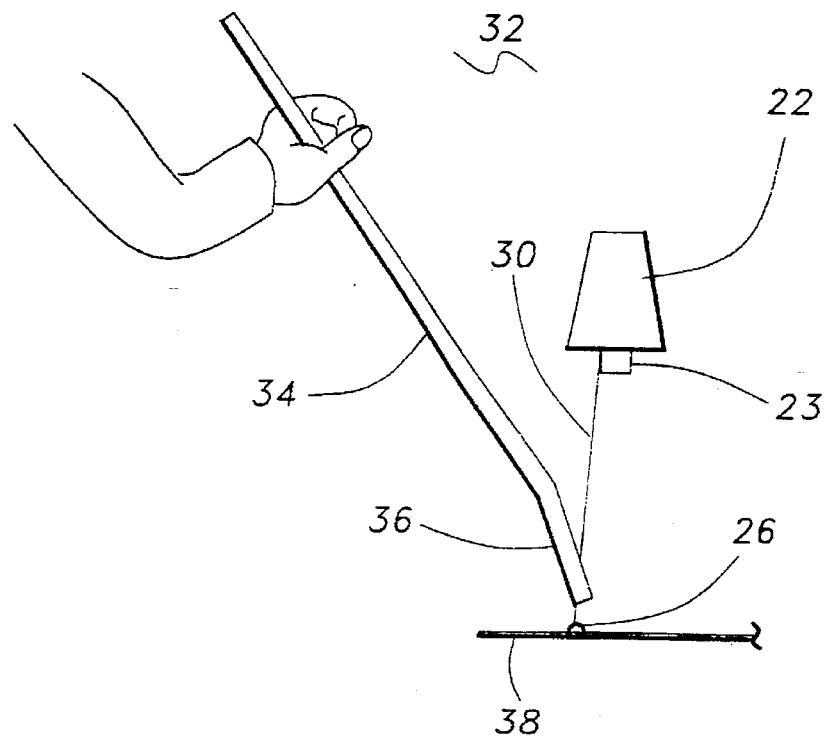
Fig-3A
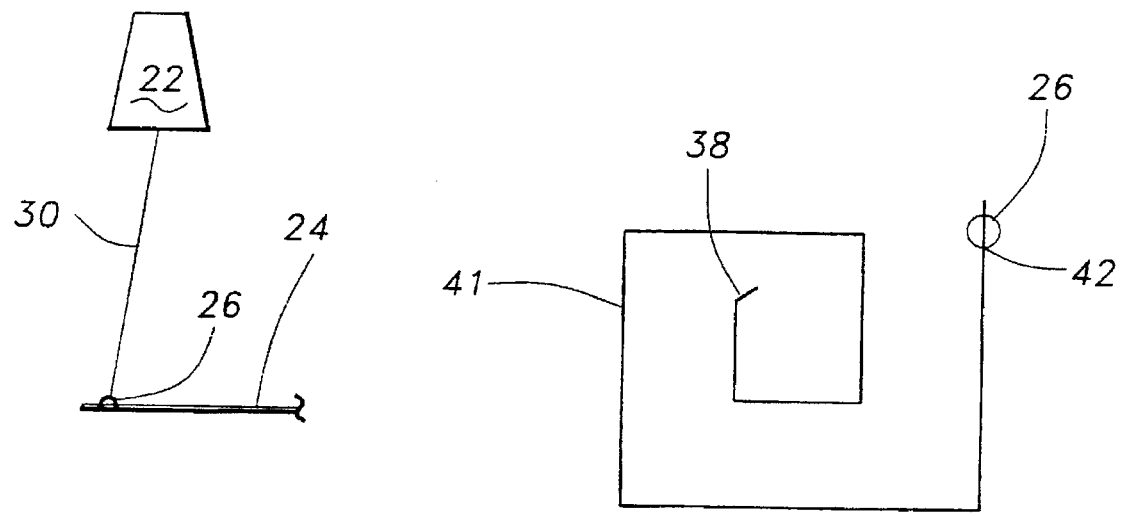
Fig-4
Fig-3B

METHOD OF CALIBRATING LASER PROJECTOR USING MOVING REFLECTOR

BACKGROUND OF THE INVENTION

This invention relates to a method of efficiently and quickly calibrating a laser projector relative to reference points.

In the prior art, laser projectors have become widely used in displaying scanner laser images for a variety of work assisting applications. As one example, a laser projector may be utilized to provide a template or outline of parts to be assembled together. One specific example in the prior art is the use of laser projectors to display the images of truss components, such that a truss assembler may then assemble the truss components utilizing the displayed image. Other applications in the prior art are the use of a laser projector to display the desired location for plys of material laid up to form parts which form the body of a vehicle such as an airplane, or to display the location of parts to be cut from a workpiece such as a piece of leather or textile material. Laser projectors are also frequently utilized to digitize information about the surface of a workpiece.

In many applications, the initial step in beginning to utilize the laser projector is to calibrate the location of the laser projector relative to the workpiece. It is important that a controller for the laser projector know exactly where the laser projector is relative to reference points, or be calibrated. The laser projector is not able to display information on the workpiece, or record information relative to the workpiece unless it knows where it is exactly relative to the workpiece.

Calibration is essential for most industrial applications. In contrast, in laser light shows a laser projector may be utilized to display an image on a surface. Whether that image is misplaced by a small amount on the surface typically does not matter. However, when the laser projector is utilized to display information on a workpiece or record information about the workpiece, accurate calibration or positioning becomes essential.

To this end, it is required to position fixed reference points at known locations adjacent the workpiece. An initial calibration step is performed wherein the laser projector identifies where it is relative to the fixed reference points. Once the laser projector knows where it is relative to the reference points, by known calibration equations the laser projector can identify its own location in space relative to the workpiece.

In some systems the laser beam displays an image of an expanding box to find the reference point. Some other calibration steps have been used to assist in locating the reference points.

One method of calibrating the location of the laser projector relative to the reference points is disclosed in prior U.S. Pat. No. 5,381,258, which is assigned to the assignee of the present application. In that application, a laser beam is directed from the laser projector, and a worker utilizes a computer mouse to move that laser beam adjacent to the reference point. The reference points are reflective. The laser beam is then moved to create an expanding scanning box adjacent to the reference point. The scanning box will eventually cross the reference point, and the beam is reflected back to the laser projector. The laser projector can then begin to identify its location relative to the reference point. Once all of the reference points have been identified, the laser projector will be able to identify where it is relative to those reference points.

In addition, the above-referenced prior United States patent also discloses the concept of moving a reflector into the path of the laser beam. The laser beam is then reflected back to the projector, to be utilized to modify the display of the projector.

The prior art use of a mouse to move the laser beam, and the subsequent use of an expanding box to focus the laser beam on the reference point may sometimes be inefficient. Further, the use of the mouse requires some degree of skill in manipulating the computer mouse. Often, these systems are utilized in an industrial facility, and it would be preferable that a lesser degree of skill is required for calibrating the laser projector relative to the workpiece.

SUMMARY OF THE INVENTION

In a disclosed embodiment of this invention, a method of calibrating a laser projector includes the steps of moving a reflector into the beam of the laser beam, and then moving the beam with the reflector towards the reference point. The operator initially places the reflector into the path of the beam, and moves the reflector toward the reference point. A control for the beam moves the beam with the moving reflector by utilizing the reflected beam as feedback.

Once the reflector is adjacent the reference point it is moved out of beam. The control then initiates a search procedure that adjusts the position of the beam to be directed at the reference point. The control can then identify the relative location of the reference point.

With the inventive method, no complex computer manipulation is required to calibrate the projector relative to the reference point. Moreover, the calibration is performed much more efficiently and quickly than with the prior art methods.

These and other features and objects of the present invention can be best understood from the following specification and drawings, of which the following is a brief description.

BRIEF DESCRIPTION OF THE DRAWINGS

FIG. 3A shows yet another subsequent step in the calibration of the laser projector.

FIG. 3B shows a detail of the FIG. 3A step.

FIG. 4 shows the laser having calibrated itself to a first reference point.

DETAILED DESCRIPTION OF A PREFERRED EMBODIMENT

Figure 1:
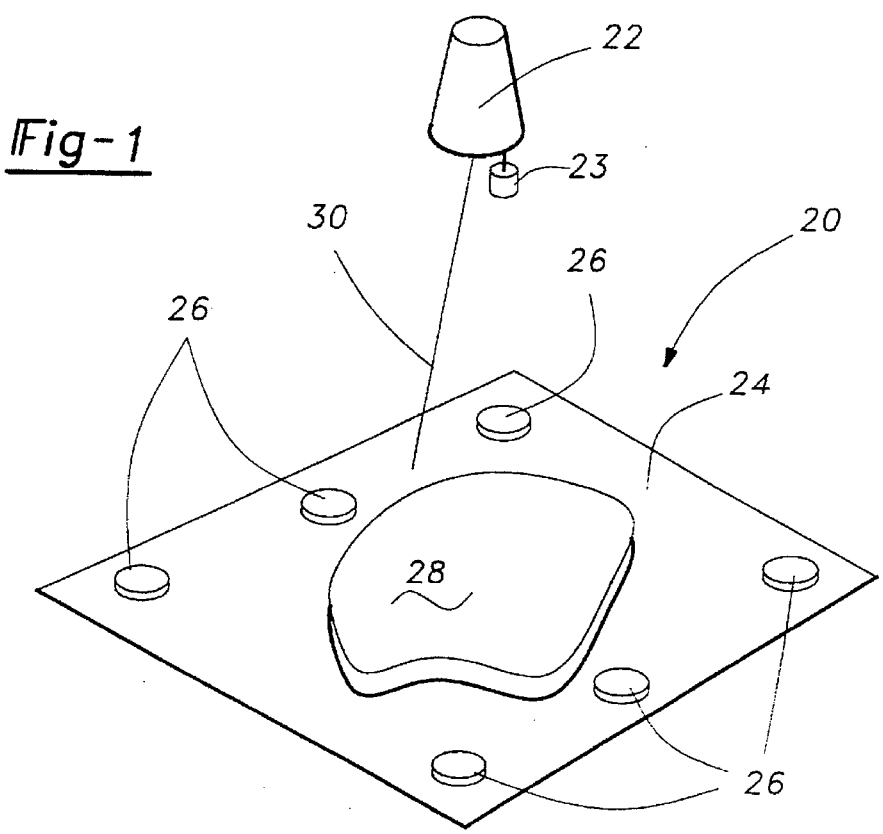
FIG. 1 is a highly schematic view of a laser projector system, showing an initial step in the calibration of the laser projector.

FIG. 1 is a schematic view of a laser projector system 20. A laser projector 22 is of the known type including a laser generator and 2 mirror systems known as galvanometers for directing the beam from the laser onto a work surface. A sensor 23 for sensing reflected light is also incorporated into the known projector. Sensor 23 is shown schematically and could be any sensor at other positions relative to the projector. Typically, the sensor is positioned adjacent to, or inside of, the projector.

A work surface 24 is shown, and may be a table or other work holding structure. A plurality of reference points 26 are mounted on the work table 24. Reference points 26 may be fixed at known locations in table 24, or may be spread randomly about the surface of the table 24 as is disclosed in the co-pending patent application Ser. No. 08/522,985, also owned by the assignee of the present invention.

A workpiece 28 is shown schematically, and may be a workpiece that is to be digitized by the system 20, a workpiece such as a piece of leather or textile which is to be cut in combination with a display from the projector, a body of an airplane to receive plys, a combination of parts assembled based upon the display (such as truss components) or any other type workpiece. The exact type of application or type of workpiece 28 is not limiting on this invention.

A laser beam 30 is shown directed from projector 22 off table 24. For projector 22 to be able to display information accurately on table 24 or on workpiece 28, an initial step of calibrating the laser projector 22 by allowing beam 30 to identify the location of the reference points 26 is necessary.

Figure 2A:
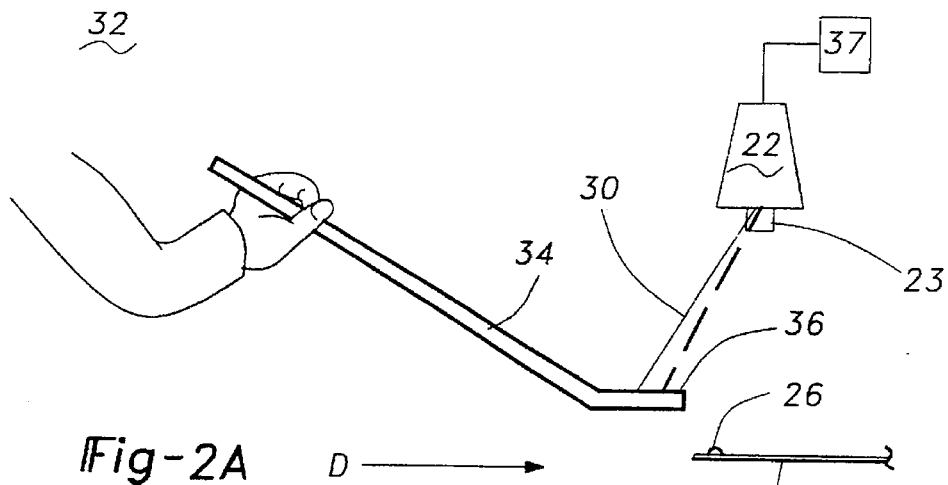
FIG. 2A shows a subsequent step in the calibration of the laser projector.

A worker is shown in FIG. 2A beginning the calibration of the laser projector 22 to a first reference point 26. Worker 32 holds a reflector 34, that may have a handle leading to a reflective portion 36. Reflective portion 36 may be of the type disclosed in the above-referenced U.S. Pat. No. 5,381, 298. Reflective portion 36 is moved into the path of beam 30. The beam will be reflected back to the sensor 23 in laser projector 22, as disclosed in the above-referenced United States Patent. A control for the laser projector, shown schematically at 37, is programmed in a calibration mode of operation to follow the moving reflective element 36 by receiving feedback from the reflected beam. Thus, the operator moves the reflective portion 36 in the direction of the arrow D as shown in FIG. 2A, and towards the reference point 26.

One preferred method of moving the laser beam 30 with the reflector 34 is to project the laser beam 30 into a pattern that is generally larger than the reflective portion 36. The reflected beam will provide feedback of the direction of movement of reflective portion 36, as it will only be reflected from a portion of the projected image crossed by the reflective portion 36. The control 37 moves the laser beam 30 in the direction that it has sensed the reflective member 36 is moving. Thus, laser beam 30 will move with the reflective member 34.

Figure 2B:
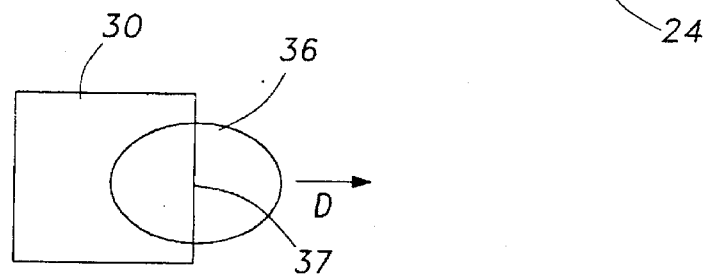
FIG. 2B shows a detail of the FIG. 2A step.

FIG. 2B schematically shows a detail of how the control 37 may monitor movement of the reflector 34 and reflective portion 36. As shown, the laser beam 30 is directed into a shape such as a box. When the reflective portion 36 is moved in the direction D, it will cross only a portion of that box, such as portion 39. It is portion 39 that will be reflected back towards sensor 23. Thus, control 37 will have an indication of the direction of movement D.

As shown in FIG. 3A, when operator 32 approaches reference point 26, the reflective portion 36 is removed from beam 30. The reflective position is preferably turned to face downwardly, as simply moving it outwardly would cause the beam 30 to also move. As shown, the downward facing member 34 can then be removed. Beam 30 is now at a postion near reference point 26.

Once the laser beam 30 is directed near the reference point 26, there should be no further movement of the reflected beam 40. Reflector 34 has been removed. Once there has been a predetermined period of time without movement, (on the order of a few seconds), the control 37 will recognize that the beam has now been moved adjacent to a reference point. Some search technique, such as a small scanning box, or movement about the area of the reference point is commenced by the laser beam 30 until control 37 identifies the exact location of reference point 26, in a manner known in the prior art. Once the exact location of reference point 26 is identified, the beam 30 takes the position as shown in FIG. 4, and has now identified the location of the reference point 26. Alternatively, once the control 37 senses that it is no longer receiving a reflective beam, it may immediately begin the search proceedure.

Although it may be possible for the beam 30 to be directed onto reference point 26 by relective member 34, in most instances, the beam 30 is initially adjacent, but spaced from reference point 26, such as at point 38. In such instances, once the beam 30 has not been moved for a period of time, a search technique may commence. The search technique is shown schematically in FIG. 3B. Any other search technique may also be utilized. In this known search technique, the beam 30 moves from point 38 into an expanding spiral 41 that takes the shape of an expanding box. That is, the spiral expands rapidily and appears as a box to the visual eye. Expanding spiral 41 will eventually cross the reference point 26, as shown at 42. The beam will then be reflected back toward the sensor 23 to identify the exact location of reference point 26. At that time, the direction of the beam 30 is directed toward the reference point 26. As an alternative, the reference point may be a sensor itself and the beam received from portion 36 may be sensed by reference point 26 to identify the location of projector 22, without reflected beam 40.

As shown in FIG. 4, beam 30 is now directed at the reference point 26. The controller 37 has now identified the location of the reference point 26. The same process proceeds for the other reference points 26, and the projector 22 will then know where it is in space relative to the work surface 24 or workpiece 28.

The present invention allows an operator to quickly calibrate the laser projector 22, without any detailed computer training. Moreover, this inventive method is much quicker than the prior art manipulation of the computer mouse, etc. The controls necessary for achieving the above method steps are well within the skill of a worker in the art. It is the inventive use of the method steps of moving the beam with the moving reflector to the reference point which forms the inventive aspects of this invention.

Although a preferred embodiment of this invention has been disclosed, a worker of ordinary skill in the art would recognize that certain modifications would come within the scope of this invention. For that reason, the following claims should be studied to determine the true scope and content of this invention.

We claim:

1. A method of calibrating the position of a laser projector relative to reference points comprising the steps of:
   (1) providing a plurality of reference points;
   (2) providing a laser projector opposite said reference points;
   (3) directing a laser beam from said laser projector;
   (4) moving a reflective member into the path of said laser beam such that a portion of said laser beam is reflected by said reflective member back to said laser projector;
   (5) moving said reflective member towards one of said reference points; and
   (6) moving said laser beam with said reflective member until said laser beam is directed adjacent said one of said reference points to begin to calibrate the position of said laser projector relative to said one reference point.

2. A method as recited in claim 1, wherein said laser projector is positioned adjacent a work surface, and steps 3–6 are repeated for said plurality of reference points to fully calibrate the location of said laser projector relative to said work surface.

3. A method as recited in claim 2, wherein said reference points are fixed relative to said work surface.

4. A method as recited in claim 1, wherein said reflective member is removed from said laser beam once said reflective member has moved said laser beam adjacent to said one reference point.

5. A method as recited in claim 4, wherein said laser beam moves with said reflective member as said reflective member is moved toward said one reference point.

6. A method as recited in claim 1, wherein said one reference point is also reflective, and when said laser beam is directed onto said one reference point, a portion of said beam is reflected back toward said laser projector.

7. A method as recited in claim 6, wherein a sensor is incorporated into said laser projector to identify said reflected portion.

8. A method as recited in claim 7, wherein said reflective member is removed from said laser beam once said reflective member has moved said laser beam adjacent to said one reference point.

9. A method as recited in claim 8, wherein said laser projector searches for said one reference point by moving in the area to which it had been directed by said reflective member until it identifies said one reference point.

10. A method as recited in claim 9, wherein said laser projector begins said search for the location of said one reference point once it has not been moved for a predetermined period of time.

11. A method as recited in claim 9, wherein said laser projector begins said search for the location of said one reference point once said reflective member has been removed from said laser beam.

12. A method of calibrating the position of a laser projector relative to reference points comprising the steps of:

(1) providing a plurality of reference points adjacent to a work surface;

(2) providing a laser projector opposite said work surface;

(3) directing a laser beam from said laser projector in a pattern;

(4) moving a reflective member into the path of said laser beam, such that a portion of said laser beam is reflected by said reflective member back to said laser projector;

(5) moving said reflective member toward one of said reference points, the reflective beam of said laser beam being reflected back to said laser projector;

(6) identifying the movement direction of said reflective member from the reflected portion of said laser beam;

(7) moving said laser beam in said direction;

(8) removing said reflective member from said laser beam;

(9) said laser beam beginning to search for the exact location of said reference point, and beginning to calibrate the position of said laser projector relative to said reference point.

13. A method as recited in claim 12, wherein said reference points are fixed relative to said work surface.

14. A method as recited in claim 13, wherein steps 3–9 are repeated for a plurality of reference points to calibrate the location of said laser projector relative to said work surface.

15. A method as recited in claim 12, wherein said reflective member is turned to begin removal from said laser beam once said reflective member has moved said laser beam adjacent to said reference point.

16. A method as recited in claim 15, wherein said laser beam begins to search for said exact location after not having been moved for a period of time.

17. A method as recited in claim 15, wherein said laser beam begins to search for said exact location of said reference point once said reflective member has been removed from said laser beam.

18. A method as recited in claim 12, wherein said laser beam begins to search for said exact location after not having been moved for a period of time.

19. A method as recited in claim 12, wherein said laser beam begins to search for said exact location of said reference point once said reflective member has been removed from said laser beam.

* * * * *